United States Patent [19]

Agrawal et al.

[11] Patent Number: 5,513,339

[45] Date of Patent: Apr. 30, 1996

[54] CONCURRENT FAULT SIMULATION OF CIRCUITS WITH BOTH LOGIC ELEMENTS AND FUNCTIONAL CIRCUITS

[75] Inventors: Prathima Agrawal, New Providence; Soumitra Bose, Phillipsburg, both of N.J.

[73] Assignee: AT&T Corp., Murray Hill, N.J.

[21] Appl. No.: 358,663

[22] Filed: Dec. 19, 1994

Related U.S. Application Data

[63] Continuation of Ser. No. 954,547, Sep. 30, 1992, abandoned.
[51] Int. Cl.$^6$ ................................................. G06F 11/277
[52] U.S. Cl. ......................... 395/500; 364/488; 364/490; 371/24; 371/25.1
[58] Field of Search .................................. 364/488, 489, 364/490, 578; 371/23, 24, 25.1; 395/500

[56] References Cited

U.S. PATENT DOCUMENTS

| | | | |
|---|---|---|---|
| 4,769,817 | 9/1988 | Krohn et al. | 371/23 |
| 5,093,920 | 3/1992 | Agrawal et al. | 395/800 |
| 5,184,308 | 2/1993 | Nagai et al. | 364/489 |

OTHER PUBLICATIONS

M. Abramovici, et al., "Concurrent Fault Simulation Functional Level Modeling," in Design Automation Conference, 1977.
P. Agrawal, et al., "Fault Simulation in a Pipelined Multiprocessor System," in IEEE Inter'l. Test Conf., 1989.
P. Agrawal, et al., "MARS: A Multiprocessor-based programmable accelerator," IEEE Design and Test of Computers, Oct., 1987.
P. Agrawal, et al., "Modeling and Sumulation of Functional Memory Blocks in the MARS Accelerator," in CAD Accelerators, pp. 73–83, Elesvier Science Publishers B.V. (North Holland), 1991, Int'l. Workshop on Hardware Accelerators, Oxford, England, Sep. 20–21, 1989.
W. C. Athas, et al., "Multicomputers: Message–Passing Concurrent Computers," in IEEE Computer, pp. 9–24, Aug. 1988.
L. P. Henckels, et al., "Functional Level, Concurrent Fault Simulation," IEEE Test Conf., 1980.
C. Y. Lo, et al., "Algorithms for an Advanced Fault Simulation System in MOTIS," IEEE Transactions on Computer Aided Design, Mar. 1987,
P. R. Menon, et al., "Deductive Fault Simulation with Functional Blocks," IEEE Transactions on Computers, Aug. 1978.
E. G. Ulrich, et al., "Concurrent Simulation of Nearly Identical Digital Networks," Computer, pp. 39–44, Apr. 1974.
S. Bose, et al., "Concurrent Fault Simulation of Logic Gates and Memory Blocks on Message Passing Multicomputers," 29th ACM/IEEE Design Automation Conf., 1992.

*Primary Examiner*—Ken S. Kim
*Attorney, Agent, or Firm*—Geoffrey D. Green

[57] ABSTRACT

Test vectors for a circuit containing both logic gates and memory blocks are evaluated by applying candidate test vectors to good and faulty versions of the circuit in a computer simulation. The functions of the gates and interconnections in the circuit are stored in memory and the operation of the good and faulty circuits is simulated concurrently. During the simulation, a memory record is created for storing the state of a circuit element in a faulty circuit if the fault is visible at the element. Such records are removed when no longer needed, which speeds up the simulation. A multiprocessor in a pipeline configuration is disclosed for performing the simulation. A first branch in the pipeline simulates the logic gates in the circuit; a second branch simulates the memory blocks.

6 Claims, 11 Drawing Sheets

CONCURRENT FAULT SIMULATION OF CIRCUITS WITH BOTH LOGIC ELEMENTS AND FUNCTIONAL CIRCUITS

This application is a continuation of application Ser. No. 07/954,547, filed on Sep. 30, 1992, now abandoned.

TECHNICAL FIELD

This invention relates to fault simulation of digital logic circuits containing both logic elements, such as AND and OR gates, and functional elements, such as memory blocks, and more specifically to concurrent simulation of faults in such circuits using a pipelined multiprocessor and dynamic memory allocation to speed up the simulation.

BACKGROUND OF THE INVENTION

With the growing complexity of designs for VLSI integrated circuit chips, there is an ever increasing need for improvements in methods of testing such chips. Because it is not practical to exhaustively test all the logic and memory circuits on such a chip, a suite of test vectors is typically selected that will exercise the chip sufficiently to expose a relatively high percentage of possible faults. Use of such a suite in testing manufactured chips then gives a high probability that all existing faults will be detected.

In developing a suitable test-vector suite, it is well known to evaluate a given test vector with respect to a given fault in a simulated circuit by applying the test vector to the inputs of the circuit both with and without the fault and comparing the outputs from the circuit. The test vector has detected the fault if the outputs are different, but not if the outputs are the same.

Fault simulation, then, uses the techniques of logic simulation with the addition of fault injection and output comparison. Such simulation can require large amounts of data handling for complex circuits. For this reason, it has been useful to augment the computing power of existing computers to handle the additional computing load within a reasonable time. Devices to accomplish this task are known as hardware accelerators. One such hardware accelerator for use in circuit simulation is disclosed in U.S. Pat. No. 5,093,920. Such accelerator includes a number of separate processors connected in pipeline fashion with the simulation being carried out with each processor performing part of the overall simulation algorithm. The processors communicate by passing messages to each other relating to "events" occurring in the circuit being simulated. An event is a change in state of one of the elements in the circuit, for example, the change in state of the output of an AND gate from "0" to "1". Simulation is initiated by injecting messages into the pipeline to simulate events occurring on the inputs of the circuit when a test vector is applied to such inputs. Each event can give rise to subsequent events in the circuit in a recursive fashion. When the effects of all such events have been propagated through the simulated circuit, the outputs of the circuit for such test vector are logged.

One method of simulating multiple faults in a circuit includes simulating the circuit without faults (the "good" circuit) with a suite of test vectors to determine the output of such circuit for each test vector, then injecting a fault (thereby creating a "faulty" circuit), repeating the simulation and comparing the outputs to determine which of the vectors detected the fault. If it is desired to simulate a large number of faults and a large suite of test vectors, such procedure can be extremely time consuming and, therefore, impractical for complex circuits. A commonly practiced alternative is to perform a concurrent simulation of the good circuit and a number (e.g., 1000) of faulty circuits. If organized properly, such concurrent simulation saves repeated simulation of those parts of the good circuit that are not affected by a given fault. Concurrent fault simulation in a pipeline hardware accelerator is described in "Fault Simulation in a Pipelined Multiprocessor System," by Prathima Agrawal et al. in the Proceedings of the IEEE 1989 International Test Conference, p.727. Concurrent simulation is described also in U.S. Pat. No. 4,769,817.

An additional problem in simulating the effect of circuit faults is the simulation of the effect of such faults on functional circuits, such as memory blocks, programmable gate arrays and other multiple input, multiple output combinational or sequential circuits. Memory blocks, such as registers, random-access memories and read-only memories, are typical in VLSI circuits and fault simulation of such circuits cannot be considered complete without taking such memory blocks into account. It is not always necessary to consider faults in the memory blocks or other functional circuits themselves; it is often sufficient to just simulate the effects on memory blocks of faults external to the memory blocks. The simulation of memory blocks in circuits is described in "Modeling and Simulation of Functional Memory Blocks in the MARS Accelerator" by Prathima Agrawal et al. in the Proceedings of the International Workshop on Hardware Accelerators, Oxford, England 1989. Fault simulation of memory blocks is also alluded to briefly in such paper and in the paper referred to in the previous paragraph.

When concurrent fault simulation is being performed for a complex circuit, with or without functional circuits, in a pipelined hardware accelerator, it is desirable to find efficient ways of handling the data storage and processing problems. Such problems are exacerbated when functional circuits, such as memory blocks, are included because the effects of external faults on data stored in the memory block must be tracked. Much of the processing in fault simulation involves searching for data records relating to the effects of given faults on the various circuit elements. It is therefore desirable to minimize the time for such searches, and the amount of storage needed for such records, by eliminating records created early in a simulation that are no longer needed. Accordingly, it is an object of the invention to achieve an efficient method and apparatus for controlling the data records for concurrent fault simulation in a pipeline hardware accelerator. It is a further object of the invention to extend such method and apparatus for such fault simulation wherein functional circuits such as memory blocks are included in the circuit being simulated. Other objects of the invention will be apparent from the following specification and attached drawings.

SUMMARY OF THE INVENTION

Test vectors for a circuit containing both logic gates and memory blocks are evaluated by applying candidate test vectors to good and faulty versions of the circuit in a computer simulation. The functions of the gates and interconnections in the circuit are stored in memory and the operation of the good and faulty circuits is simulated concurrently. During the simulation, a memory record is created for storing the state of a circuit element in a faulty circuit if the fault is visible at the element. Such records are removed when no longer needed, which speeds up the simulation. A multiprocessor in a pipeline configuration is disclosed for performing the simulation. A first branch in the pipeline simulates the logic gates in the circuit; a second branch simulates the memory blocks.

These and other aspects of the invention will become apparent from the attached drawings and detailed description.

DETAILED DESCRIPTION

The invention will described in terms of a special or general purpose multicomputer comprising a number of separate processors arranged in a pipeline configuration. Such a multicomputer is typically configured as a hardware accelerator for use in a host computer. However, it will be clear to the skilled practitioner that the invention can be implemented using other types of computers, if desired.

Figure 1:
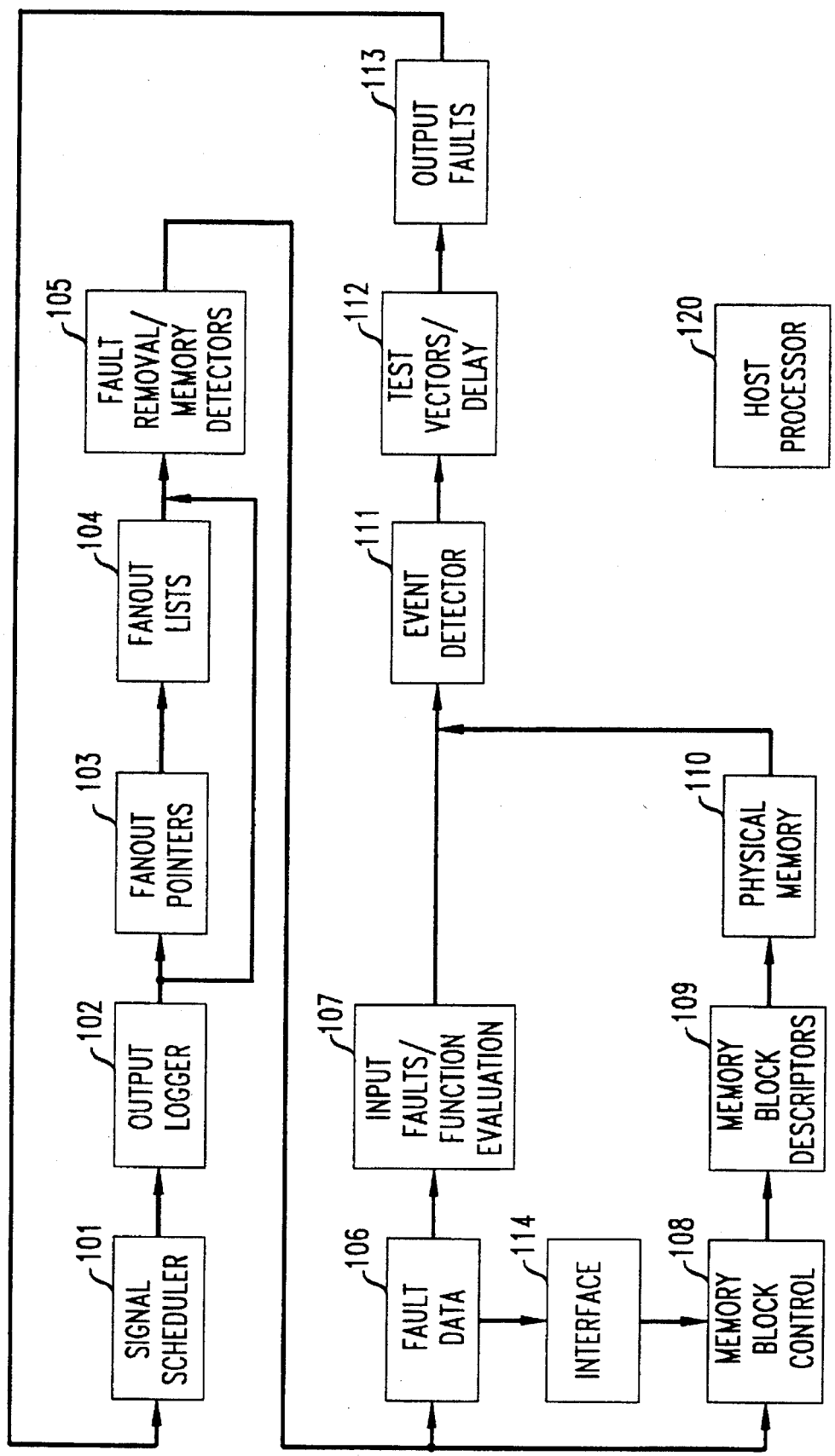
FIG. 1 is a block diagram of a pipelined multiprocessor configured for fault simulation in accordance with the invention.

FIG. 1 is a block diagram of the processors of multicomputer 100 arranged in a pipeline configuration for use in concurrent fault simulation in accordance with the invention wherein separate parallel paths or branches are provided for simulation of logic-gates and functional circuits, respectively. The invention will be described with the assumption that the functional circuits are all memory blocks, but it will be clear to those skilled in the an that the invention is applicable to other kinds of functional circuits. The principal paths for messages between processors 101–114 are shown; however, paths not shown between certain pairs of processors can be used in certain circumstances, as will be described. Other paths (not shown) are also provided between host processor 120 and processors 101–114. Typically, processors 101–114 will be in the form of a hardware accelerator for use in host processor 120. Processors 101–114 each contain program memory (typically 8 kilobytes) and data memory (typically 4 to 8 megabytes) that can be downloaded as needed from host processor 120. An example of a processor that can be used for host processor 120 is a Sun 4 SPARC Station. A typical simulation problem for such a processor configuration can involve up to sixty-four thousand four-input logic gates, up to one thousand faults and millions of test vectors.

The division of functions among processors 101–114 depends on the complexity of the functions to be performed, the amount of data storage needed for each function and the sequence in which the functions are performed. As will be seen, some processors perform more than one function and other processors can be replicated to eliminate bottlenecks.

In a particular embodiment of the invention, the logic circuits to be simulated are represented by means of primitive elements, each having four input terminals and one output terminal. Each such terminal can be in one of four states "0", "1", unknown, or unused. Logic gates having more than four inputs and functional circuits, such as memory blocks, having more than four inputs and/or more than one output are represented as groups of such primitives. Thus, an eight-input AND gate would be represented by three primitives: two four-input AND gates with outputs connected to the inputs of a two-input AND gate. Memory blocks are also represented by similar elements. For example, a memory block having three lines for control, eight input lines for the address, eight input lines for data and eight output lines for data can be represented by five primitive elements: a first primitive element for the three control lines, second and third primitive elements for the eight address lines and fourth and fifth primitive elements for the data input and output lines. One input terminal and the output terminal on the first primitive element are unused and the output terminals on the second and third primitive elements are unused.

As a result of this representation structure, the various data records and tables representing states of logic gates and memory blocks and the various messages circulating in the pipeline can have similar formats regardless of the size and type of the circuit elements being represented.

The function of each processor will now be described briefly, then the overall operation of the invention will be explained in more detail. The topology of the circuit being simulated is loaded by host processor 120 into fanout list processor 104 in the form of lists of points to which each circuit element is connected. Pointers to the beginning of such fanout lists are stored in fanout pointers processor 103. For purposes that will become apparent below, connections from logic gates to the input terminals of memory blocks are also stored in interface processor 114. The type of each primitive in the circuit (i.e. AND, OR, NOT) is stored in input faults/function processor 107, which has a dual function of (i) altering event messages to insert input faults for faulty circuits and (ii) simulating the functions of the various kinds of gates. The characteristics of each memory block in the circuit are stored in memory block control processor 108 and memory block descriptors processor 109.

As will become apparent, two general kinds of event messages circulate in the pipeline: (i) messages that change the state of inputs and outputs of circuit elements and (ii) messages that add and delete records relating to faults in the circuit being simulated.

The suite of test vectors to be used in a simulation is stored in test vectors/delay processor 112, which also stores delay information for each circuit element. Signal scheduler 101 coordinates and transmits event messages into the pipeline in response to messages received from the pipeline. At the beginning of the simulation of the response to a test vector, such messages originate in processor 112; as simulation proceeds, such messages result from the simulated operation of the circuit and originate in event detector 111 and other processors. Signal scheduler 101 maintains at least two queues for event messages to insure that such messages are sent along the pipeline in proper sequence.

Output logger 102 records the states of the signals on the ultimate output terminals of the circuit being simulated. When a simulation of the response to a test vector is started, event messages propagate around the pipeline until the circuit being simulated reaches a stable state. At that point in the simulation, all the queues in signal scheduler 101 will be empty and the effect on the circuit being simulated of such test vector as recorded by output logger 102 can be returned to host processor 120.

Event messages destined for logic gates are steered by fault removal/memory detection processor 105 to fault data processor 106. A link list of records is stored in the memory of processor 106 for each logic gate in the circuit being simulated. Each record contains the following fields:

fid, inputs, injectionflag, pointer where "fid" is a fault identification number identifying the particular fault to which such record pertains, "inputs" stores the states of the signals of the input terminal pins on the logic gate, "injectionflag" is a flag that is set when the fault is injected at that particular circuit element and "pointer" is a pointer to the next record, if any, in the link list. Separate records are maintained in the link list for the good circuit and for each faulty circuit at which a fault becomes "visible" at that gate. The fault identification number for the record associated with the good circuit is set at a predetermined value, such as zero.

A similar record is also maintained in processor 106 for the primitive elements making up each memory block, but with the "pointer" field containing a value out of the range of the pointers used for link lists so that such record can be identified as that of a memory block.

The fault in a faulty circuit is considered to be "visible" at a gate if the fault is injected in the inputs or output of that gate or if the input signals to the gate otherwise become different from the corresponding signals in the good circuit because of a fault located elsewhere in the circuit. As will be seen, the link list for each gate can expand and contract dynamically, in accordance with the invention, as the simulation proceeds for a given input vector and as the effects of the faults being simulated propagate through the circuit. Such expansion and contraction results from control messages termed "diverge" and "converge" messages, respectively. A "diverge" message is sent for a faulty circuit when an input or output state of a gate in the faulty circuit are different, or "divergent" from the corresponding state in the good circuit. A "converge" message is sent when such states are the same, or convergent.

Event messages relating to signals at inputs of memory blocks are steered by processor 105 to memory block control processor 108. Similar link lists are stored for memory blocks in processors 108, 109 and 110, as will be described below.

Faults are defined in terms of an input terminal or output terminal of a gate being stuck at "0" or stuck at "1"; for example, "input number 2 to gate 36 is stuck at '1'," or "the output of gate 17 is stuck at '0'." Each faulty circuit being simulated has a single fault, and, as will be described, a number of entries are made in the memories of certain of the processors in multicomputer 100 for each faulty circuit. All such entries for a given fault have the same fault identification number.

As described above, faults within memory blocks usually are not simulated; only the effect of external faults on the information stored in the memory block is taken into account. However, it may be necessary to simulate faults on the input or output terminals of such memory blocks. For this purpose, dummy gates can be inserted into the input and output leads where such faults are to be simulated and the faults are then associated with the dummy gates. This procedure enables records associated with such faults to be stored along with records associated with faults in logic gates and simplifies access to such records during simulation.

A list of the faults to be simulated is loaded in processor 105. Each entry in the list includes the fault identification number, the number of the gate having the fault, and whether the fault is an input fault or an output fault. Also, a record is created for such fault in the link list in processor 106 for the gate having the fault, and the injection bit in such record is set to indicate that the fault is present in that gate. A pointer table is created in processor 110 with an entry for each fault. Such table is used in storing differences in memory contents between good and faulty circuits. Finally, for input faults, the location and type of fault (stuck at "1" or stuck at "0") is stored in processor 107 and for output faults the location and type of fault is stored in output faults processor 113.

As described above, the signals at the input and output terminals of the logic gates and memory blocks being simulated each have one of four values: "0", "1", "unknown" or "unused". When information about a circuit is first loaded, the states of all such signals are typically initialized to the "unknown" state.

After the fault information and input vectors have been loaded as described above and simulation begins, signal scheduler 101 requests the first input vector by sending a message over a path (not shown) to processor 112. Processor 112 then transmits an initial series of event messages into the pipeline based on the first input vector stored in such processor. Each event message at this point consists of the following fields:

sourcegate, fid, cdflag, state, delay where "sourcegate" is an identification of the gate that is the source of the event (in this case an input terminal of the circuit being simulated), "fid" is a fault identification number, "cdflag" is a four-state control flag, "state" is the state of the output signal at such source, and "delay" is relevant delay information for such signal. In these messages., the fault identification number will be set to identify the good circuit ("zero" is typically used for this purpose) and the delay information will indicate no delay. The cdflag, which will be explained in more detail below, relates to faulty circuits and is not used for the good circuit.

Since these initial event messages are all identified as being for the good circuit, such messages will be repeated by output faults processor 113 to signal scheduler 101 without change. Signal scheduler 113 stacks the messages in an event queue that corresponds to no delay, then sequentially transmits the messages from such queue to output logger 102. The event messages at this point are similar to those received by signal scheduler 101, but with the "delay" field deleted. Output logger 102 passes the messages on to fanout pointers processor 103 without change. To each event message passing through, processor 103 appends a pointer giving the address in processor 104 of the fanout list associated with the source of the event. In the case of the initial messages, such sources will be the input terminals of the circuit being simulated and the fanout lists will define the connections between such input terminals and particular circuit elements in the circuit. Accordingly, the messages between processors 103 and 104 have the form:

sourcegate, fid, cdflag, state, pointer

Upon receipt of an event message from processor 103, processor 104 makes a copy of the message, without the pointer field, for each input terminal specified in the fanout list identified by the pointer and adds to each message the number of the input pin and its associated fanout gate. Each such message has the form:

sourcegate, fanoutgate, pin#, fid, cdflag, state where "fanoutgate" identifies the fanout gate and "pin#" identifies the appropriate input pin on the fanout gate.

At this point in the simulation, the only relevant function of fault removal/memory detection processor 105 is to steer event messages relating to logic gate inputs to fault data processor 106 and messages relating to memory block inputs to memory block control processor 108. For this purpose, processor 105 contains a table indicating whether "fanout gate" is a logic gate or a primitive element associated with a memory block.

Figure 2:
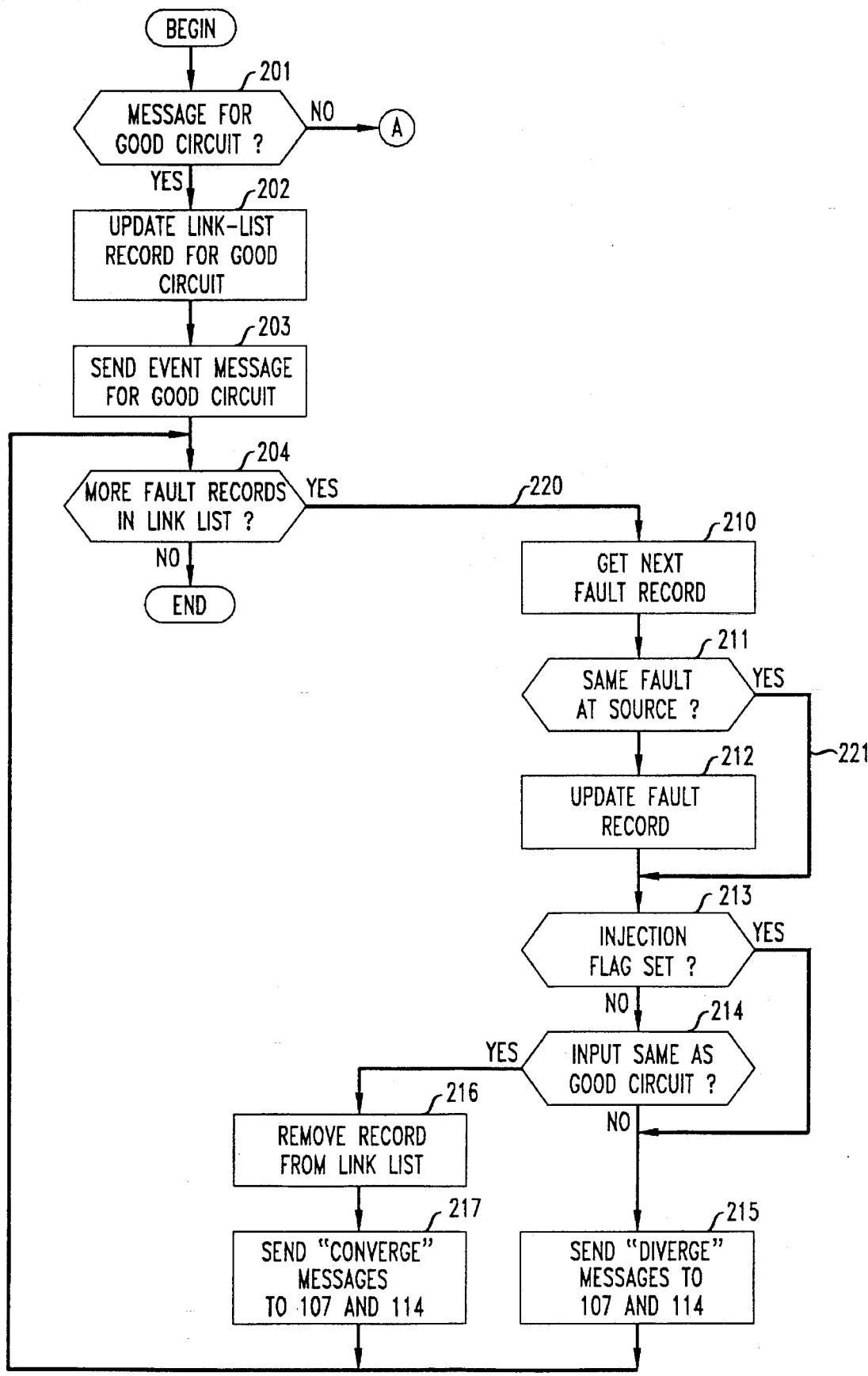
FIG. 2 is a flow chart showing the operation of a fault data processor in the pipelined multiprocessor during simulation of a good circuit.

FIG. 2 is a flow chart showing the operation of fault data processor 106, in accordance with the invention, on receipt of an event message for the good circuit from processor 105. Referring to FIG. 2, the fault identification number in the message is checked to determine whether it refers to the good circuit (block 201). Next, the "inputs" field of the "good circuit" record in the link-list for the logic gate identified in the "fanoutelement" field is updated to reflect the information in the "state" and "pin#" fields in the event message (block 202). Then, an event message containing the following fields is sent to processor 107 (block 203):

fanoutgate, previousinputs, currentinputs, fid, cdflag where, "previousinputs" contains the states of the inputs of "fanoutgate" before the update, "currentinputs" contains such states after the update, "fid" is zero because the message pertains to the good circuit and "cdflag" is irrelevant, again because the message pertains to the good circuit.

The effect of the event message with respect to all the faults then visible at the gate identified in "fanoutgate" is next taken into account. As mentioned above, a fault is "visible" at a circuit element if the fault exists at such element or if the fault changes the state of any input or output of the element with respect to the corresponding point in the good circuit as a result of its existence at another element. A visible fault at a circuit element results in a record for that fault in the link list for such circuit element. For a fault on one of the terminals of such element, such fault record is created at the time the faults being simulated are entered into the system, as described above. For a fault elsewhere in the circuit, such fault record is created when the fault becomes visible during simulation. Accordingly, if such fault records exist, then each must be processed to determine the effect of the current message with respect to such fault (block 204).

For each such fault record, a determination is made whether the same fault is visible at the source gate (block 211). This is done by noting the fault identification number from such record and searching the link list for the source gate to determine if the same fault identification number is present. If not, then the "inputs" field of such fault record is updated in accordance with the current message (block 212). If the same fault exists at the source gate, then no update is performed because such fault record will be updated by messages specifically relating to such fault.

The "injectionflag" field in the fault record is then tested to determine whether the fault in question exists on one of the terminals of the current logic gate (block 213). If so, then a "diverge" message is sent (block 215) which, as will be seen, causes additional fault records to be added to the link lists for circuit elements where a fault becomes visible during simulation. If not, the "inputs" fields in the fault record and the record for the good circuit are compared (block 214) to determine whether the input states are different for the two cases. If the states are different, then the fault is visible and a "diverge" message is sent (block 215). If the states are the same, then the fault is no longer visible at the current gate, the fault record is removed from the link list (block 216) and a "converge" message is sent (block 217). As will also be seen, a "converge" message causes fault records to be removed from link lists for other circuit elements where the fault was visible at an earlier stage in the simulation.

"Diverge" and "converge" messages are identified as such by the cdflag, which is relevant only in messages relating to faults. Such flag has four possible states: "diverge", "converge", "update" and "detected". Messages using the "update" and "detected" states will be described below. "Diverge" and "converge" messages from processor 106 each have the following format:

fanoutgate, previousinputs, currentinputs, fid, cdflag which is the same format as the event message sent for the good circuit (block 203), but with the "fid" field identifying a faulty circuit and "cdflag" identifying the kind of message being sent. "Diverge" and "converge" messages do not update states, but serve only to add or delete records relating to faults from the link lists.

In addition to the messages sent to processor 107, processor 106 also sends "diverge" and "converge" messages to interface processor 114. These messages are used to update fanin flags associated with input lines to memory blocks being simulated in processors 108 and 109. The operation of processor 114 and such flags will be described below.

Input faults/function evaluation processor 107 converts messages received from processor 106 to the following form:

sourcegate, previousstate, currentstate, fid, cdflag where "sourcegate" is the same gate identified in the "fanout gate" field in the received message. Such conversion is accomplished by modifying the values in the "previous inputs" and "currentinputs" fields in accordance with any input fault stored in processor 106 for the logic gate specified in the "sourcegate" field and then evaluating the output from such gate in accordance with the gate type, which is also stored in processor 107.

Figure 3:
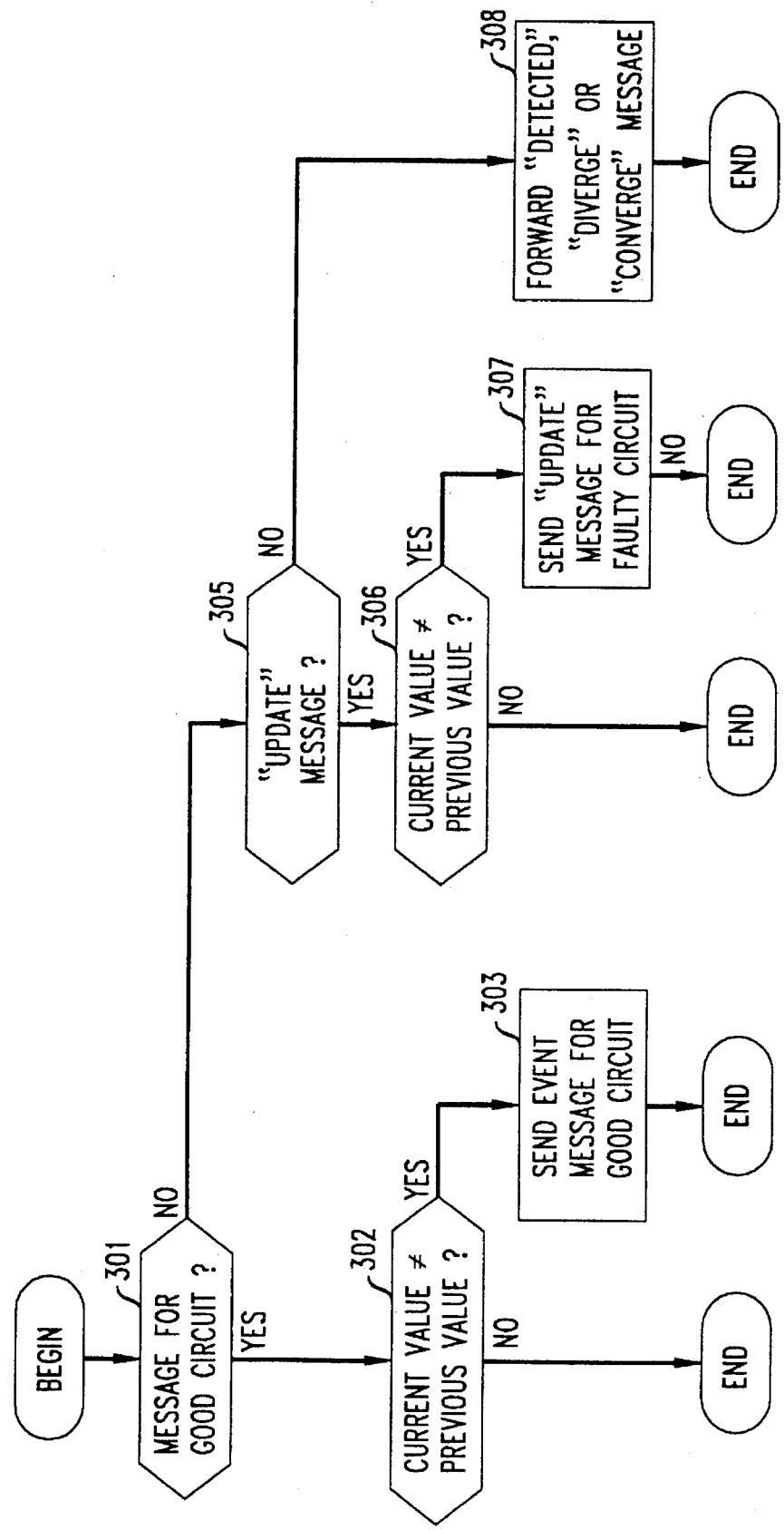
FIG. 3 is a flow chart showing the operation of an event detector processor in the pipelined multiprocessor.

The operation of event detector 111 upon receipt of a message is outlined in the flow chart shown in FIG. 3. If the message is for the good circuit (block 301), and the value of "currentstate" is not equal to the value of "previousstate" (block 302), then an event has occurred and an event message for the good circuit is sent (block 303). Such message will have the form:

sourcegate, fid, cdflag, currentstate

If the value of "currentstate" is equal to the value of "previousstate", then no event has occurred and no event message is sent.

If the received message is for a faulty circuit, then "cd flag" is tested to determine the kind of message (block 305) and if the message is an "update" message and an event has occurred (block 306) an "update" message is sent (block 307). This has the same format as the message for the good circuit, except that "fid" contains the faulty circuit identification number and "cdflag" is set to "update". No message is sent if an event has not occurred. If the message is not an "update" message, then the received message is simply forwarded (block 308). An "update" message simply update the states of the circuit elements in a faulty circuit.

Processor 112 adds a "delay" field to each event message. Such field contains relevant delay information that will be used by signal scheduler 101 to assign the message to the appropriate event queue. Output faults processor 113 modifies the "currentstate" field to correspond to the "stuck at" state for any circuit element having an output fault. As described above, information about such output faults is stored initially in processor 113.

Signal scheduler 101 is now receiving event messages that have been initiated and/or modified at various points in the pipeline. Messages for the good circuit and "update" messages for faulty circuits will have "expired" in event detector 111 if they did not cause an output terminal of a circuit element to change state. As before, signal scheduler 101 assigns each message to an event queue in accordance with the information in the "delay" field and continues to send messages along the pipeline in the appropriate sequence.

Figure 4:
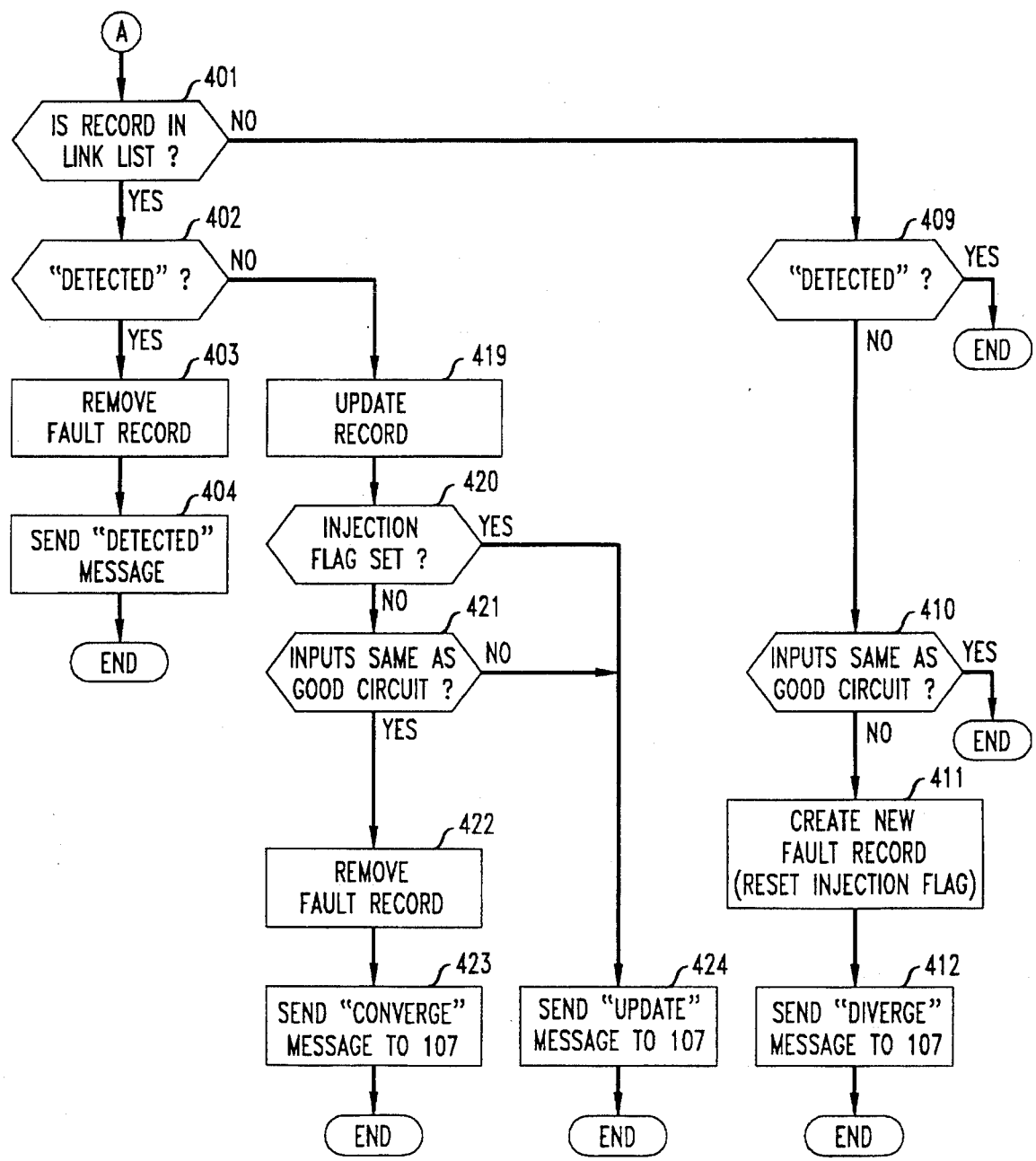
FIG. 4 is a flow chart showing the operation of the fault data processor during simulation of faulty circuits.

FIG. 4 is a flow chart showing the operation of fault data processor 106 for messages received relating to faulty circuits. Recall that the operation of processor 106 described in conjunction with FIG. 2 was for messages received relating to the good circuit, even though such messages sometimes caused processor 106 to send messages relating to faulty circuits. Recall also that the input messages to processor 106 have the format:

sourcegate, fanoutgate, pin#, fid, cdflag, state

A determination is made whether there is a record in the link list for the gate identified in "fanoutgate" for the fault identified in "fid" (block 401). If so, the "cdflag" is tested to determine whether it is set at "detected" (block 402). As will be seen, such flag is set to such state after the effects of a test vector have been completely simulated if such vector has detected the fault identified in "fid". If that is the case, the record is removed from the link list (block 403) and a "detected" message is sent (block 404) having the format:

fanoutgate, previousinputs, currentinputs, fid, cdflag and wherein "cdflag" is set at "detected".

If the fault identified in "fid" is not in the link list, then such fault is a new fault for the gate identified in "fanout gate." If the "detected" flag is set, the message is ignored (block 409). Otherwise, a determination must be made whether such fault is visible at such gate. This is accomplished by comparing the value of the "state" field in the received message with the current value for the appropriate pin of the "input" field of the link list record for the good circuit (block 410). If the values are the same, then the fault has not caused a change in the inputs of such gate and the fault is not visible at the gate. In such case, no record is added to the link list for such fault. However, if the values are different, then the fault is visible and a new record for the fault is added to the link list (block 411). In such new record, the "injectionflag" is cleared because the fault is not local but exists elsewhere in the circuit. The value of the "inputs" field of such new record is set to be the same as the corresponding record for the good circuit with the value for one pin modified in accordance with the contents of the "pin#" and "state" fields in the received message. Finally, processor 106 sends a "diverge" message to processor 107 (block 412).

The remaining branch in FIG. 4 deals with situations where the received message relates to a fault already listed in the link list and with "cdflag" set at other than "detected" (block 402). First, the record is updated with the data in the "pin#" and "state" fields of the received message (block 419). Next, the "injectionflag" field in the link list record is checked to determine whether the fault is injected at the current gate (block 420). If not, the contents of "inputs" in the link list records for the good circuit and the faulty circuits are compared (block 421). If such contents are the same, then the fault is no longer visible at the current gate, the fault record is removed from the link list (block 422) and a "converge" message is sent through the pipeline to cause removal of records for such fault from other link lists (block 423). If "injectionflag" is set, or if the "inputs" fields are different, then an "update" message is sent to update other records for such fault (block 424).

During the simulation, output logger 102 keeps a separate record of the states of the output terminals of the circuit being simulated for the good circuit and for each faulty circuit. Simulation for a given test vector is complete when all messages have "expired" and there are no further messages to be processed in the event queues of signal scheduler 101. At this point, signal scheduler 101 sends a message to output logger 102 to compare the output states logged for each fault with the outputs logged for the good circuit. If the outputs differ, the vector has detected the fault, and output logger 102 sends a "detected" message having the form:

fid, cdflag (with "cdflag" set at "detected") to processor 105, which then obtains the location (gate and pin numbers) of the fault from its fault records and appends such location to the message and forwards the message to processor 106 in the form:

fid, cdflag, location and removes the fault from its own list of fault records. Receipt of such message by processor 106 causes the link list record for such fault associated with the gate where the fault is injected to be removed and additional "detection" messages to be propagated around the pipeline. (See blocks 403, 404 and 405 in FIG. 4.) Such additional messages cause the removal of fault records for input faults from processor 107, records for output faults from processor 113, and fault records for other gates and memory blocks from link lists in processors 106, 108, 109 and 110. Accordingly, when subsequent vectors are simulated, only undetected faults are considered, thereby reducing simulation time considerably.

In FIG. 2, which diagrams the operation of processor 106 when an event message relating to the good circuit is received, the branch indicated by path 220 is taken for each fault that is visible at the current gate. For faults that also exist at the source, path 221 is taken and the procedure indicated by blocks 213–217 is carded out, resulting in the sending of a "diverge" message or a "converge" message. However, because the fault exists at the source, a message relating to such fault will also be sent by the source, which will also result in the sending of an "update", "diverge" or "converge" message in accordance with the procedure diagrammed in FIG. 4. Thus, it appears that the control messages sent as a result of following path 221 in FIG. 2 are redundant and need not be sent. However, we have found that a simulation run takes more time overall when such messages are not sent, so path 221 is included in our preferred embodiment of the invention.

Referring again to FIG. 1, the operation of processors 108, 109 and 110 in the simulation of memory blocks will now be described in detail. Such processors collectively simulate the operation of memory blocks for both good and faulty circuits. The characteristics of the various memory blocks in the circuit being simulated, such as the number of words, number of bits in each word and control-line characteristics, are loaded initially in processors 108 and 109.

As is well-known, memory blocks have input terminals for control lines (such as "read," "write" and "chip select"), address lines and data lines and output terminals for data lines. Accordingly, event messages sent from processor 105 to memory block control processor 108 can relate to any of the control, address and data input terminals of a given memory block and event messages sent from processor 110 to 111 can relate to any of the data output terminals of such memory block. The simulation of a memory "read" or "write" operation typically involves receipt of a number of event messages by processor 108 to set up the address, data and control input lines to cause the operation to occur.

The current states of the address and control input lines for each memory block for both good and faulty circuits are stored in processor 108. Similarly, the current states of the address and data input lines are stored in processor 109. In the case of the good circuit, when processor 108 receives event messages that cause a "write" operation to be simulated for a memory block, the current states of the input data lines are written into storage in physical memory processor 110 at an address specified by the current states of the address lines. Similarly, when a "read" operation is simulated, the contents of an address in such storage specified by the current states of the address lines are read into a buffer in processor 110, which processor then sends event messages reflecting the current and previous states of each data output line to event detector 111, as will be described below.

During simulation of a circuit, the states of the input and output fines of the memory blocks in the good and faulty circuits are recorded in link lists stored in processors 108, 109 and 110. Such link lists are organized similarly to the link lists for logic gates in fault data processor 106, but with the records having fields and control flags appropriate for memory block simulation. A record for a given fault is stored in the link lists for a memory block if such fault is visible at such memory block, as discussed above for logic gates. The link lists in processors 108, 109 and 110 are coordinated so that if a record is added to or deleted from a particular link list in processor 108, a corresponding record is also added to or deleted from the corresponding link list in both processors 109 and 110. The fault records for a particular fault are not removed if the fault remains visible in any of processors 108, 109 or 110. Various flags used in conjunction with fault removal in such processors will be described below.

Each good-circuit record in the link list in memory block control processor 108 includes the following fields:

block#, read, write, chipselect, et/ls, #addr, fid, pointer, address where "block#" identifies the memory block, "read," "write," and "chip-select" contain the current states of the control lines for the memory block, "et/ls" indicates whether memory access is level sensitive, leading edge triggered or trailing edge triggered, "#addr" is the number of address bits, "fid" is the fault identification number, "pointer" contains the address of the next record in the link list and "address" contains the states of the address lines Each faulty-circuit record in the link list in processor 108 contains the following fields in addition to those described in the previous paragraph:

removalflag, controlfaninflags, addressfaninflags

The "removalflag" field contains a flag used in determining whether the faulty record should be removed from the link list. The "controlfaninflags" and "addressfaninflags" fields contain flags associated with the control lines and address lines respectively. Each such flag indicates whether the fault to which the record relates is visible at the source gate driving the line.

Each good-circuit record in the memory block descriptor processor 109 contains the following fields:

block#, address, offset, #data, data, fid, pointer where "block#" identifies the memory block, "address" contains the current states of the address fines, "offset" contains an offset value used in calculating the actual address of a word in physical memory processor 110, "#data" contains the number of data lines in the memory block, "data" contains the current states of the data lines, "fid" contains the fault identification number and "pointer" contains the address of the next record in the link list.

Each faulty-circuit record in processor 109 contains the following field in addition to those described in the previous paragraph:

datafaninflags

This field contains flags associated with each data line that indicate whether the fault to which the record relates is visible at the source of the line.

Each good-circuit record in physical memory processor 110 contains memory fields representing the actual storage elements of the memory block being simulated and an output buffer field in which the states of the data output fines from the last "read" operation are stored. The actual address locations for read and write operations in processor 110 for the good circuit are calculated in processor 109 from the "address" and "offset" fields in the relevant link list record in processor 109. However, in contrast to faulty circuit records in other processors, the faulty circuit records in processor 110 contain only memory words that are different from the corresponding words stored for the good circuit. Such different words are stored in a difference list, which is a link list of address-word pairs for each memory block. If a faulty circuit "write" is to be performed and the faulty-circuit word to be written is different from the word at the same address in the good circuit, then the word for the faulty circuit is stored in such link list. The link list is accessed through a pointer table which, for each faulty circuit, includes a pointer indicating the first entry in the link list. If there are no differences to be stored for a particular faulty circuit, then the pointer for such circuit: will have a "null" value. Thus, if the pointer for a particular faulty circuit is "null," the contents of the entire memory block for that faulty circuit can be considered to be the same as the contents for the good circuit.

Processor 110 also includes a link list for each memory block with a record for the good circuit and a record for each fault visible at the memory block. Such record contains the fault identification number for the associated fault and a "lastrread" field in which the states of the data output lines from the last "read" operation for the relevant circuit are stored.

As described above, memory blocks are represented by primitive elements having four input terminals and one output terminal. Event messages directed to memory block control processor 108 have the same form as those directed to fault data processor 106, that is:

sourcegate, fanoutgate, pin#, fid, cdflag, state where the contents of "source-gate" identify the gate whose output state change gave rise to the event message and "fanout-gate" and "pin#" identify the particular input terminal (control fine, address fine, or data input line) of the memory block to which the message relates. Similarly, event messages sent by physical memory processor 110 have the same form as those sent by processor 107, that is:

sourcegate, previousstate, currentstate, fid, cdflag where the contents of "sourcegate" here identify the particular output terminal (data output fine) of the memory block to which the message relates. Again, event messages relating to the good circuit and the various faulty circuits will be identified by the contents of the "fid" field and the types of event messages relating to faulty circuits will be identified by the contents of "cdflag."

When processor 108 receives an event message relating to the control or address lines of a memory block for either the good circuit or a faulty circuit, processor 108 updates the state of the particular line in the appropriate record of its link lists. Since the states of data lines are stored only in the link list records in processor 109, if processor 108 receives an event message relating to a data line, such processor sends a message to processor 109 to update the state of the particular data line.

After updating the link list records, processor 108 determines whether a read or write operation should be initiated. This decision is based on whether the memory block being simulated is level-sensitive, leading-edge triggered or trailing-edge triggered, as indicated in the "et/ls" field stored for such memory block in processor 108 and the particular change of state, if any, of a control, address or data line as a result of the event message. In level-sensitive mode, a memory read or write is performed whenever there is a change on the address, data, read or write lines as long as the chip-select line is true. In edge-triggered mode, a memory read or write is performed only on the specified leading or trailing edge of the chip select line. If a read or write operation is to occur, processor 108 sends an appropriate control message to processor 109, which calculates the read/write address from the contents of the "address" and "offset" fields in the appropriate link list record for the good or faulty circuit involved.

Figure 5:
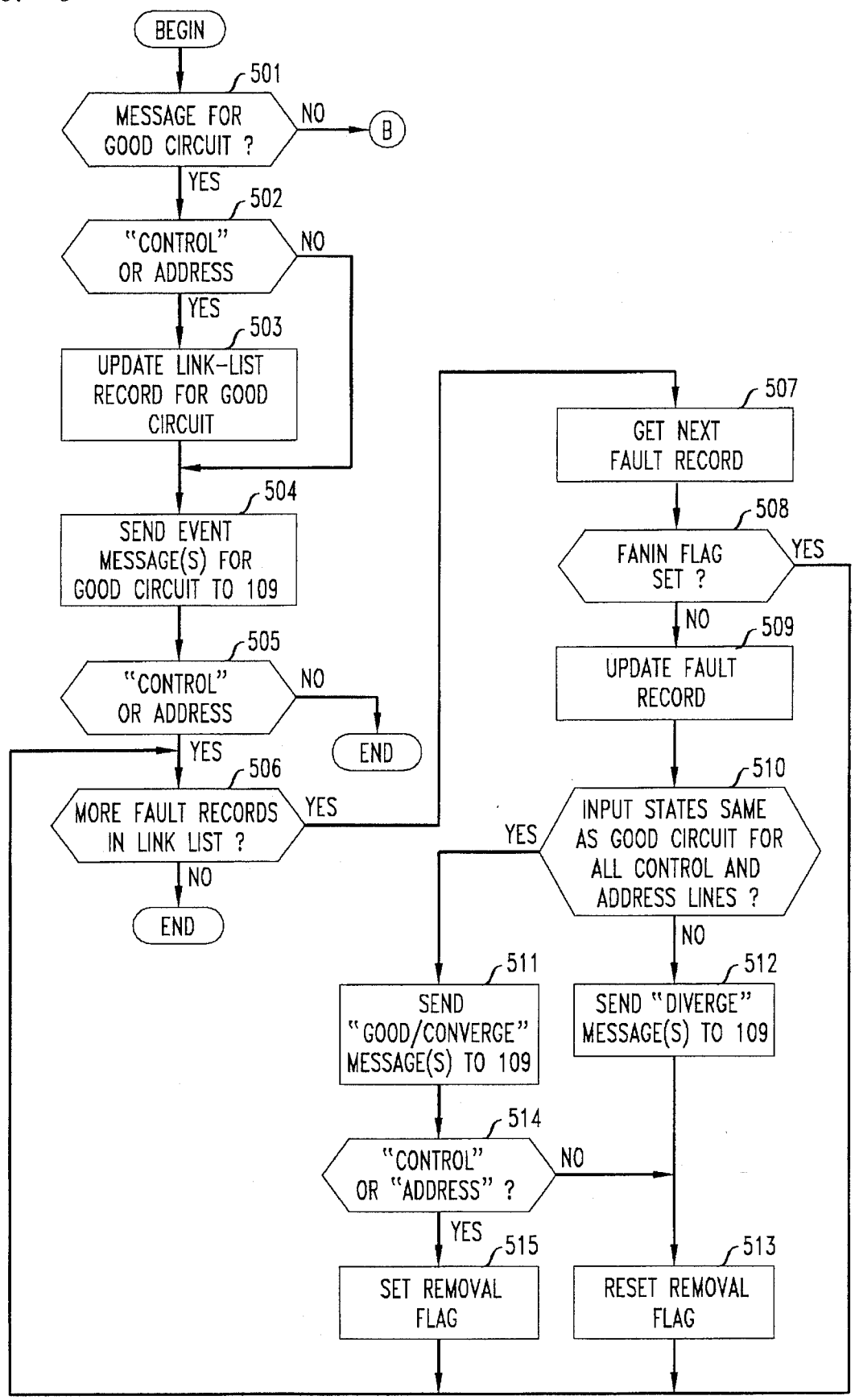
FIG. 5 is a flow chart showing the operation of a memory block control processor in the pipelined multiprocessor during simulation of a good circuit.

FIG. 5 is a flow chart showing the operation of memory block control processor 108 in response to receipt of an event message for the good circuit. If a received message is for the good circuit (block 501) and pertains to a control or address input line (block 502), the link list record for the good circuit is updated (block 503) and an event message for the good circuit is prepared and sent to processor 109 (block 504). Messages sent from processor 108 to processor 109 have the format:

fid, eventtype, cdflag, msgtype, msgvalue

The "eventtype" and "msgtype" flags and the "msgvalue" field are used in messages from processor 108 to processor 109 and from processor 109 to processor 110. The "event type" flag is used in conjunction with "converge" messages and indicates "good" if the message being sent results from a message received at processor 108 for the good circuit and "faulty" if the message being sent results from a message received for a faulty circuit. The "msgtype" flag indicates which of several types of message is being sent. For messages from processor 108 to processor 109, such types are "address", "dam ", "read", "write", "assert", "create", "detected" and "removal." The information in the "msg value" field depends on the type of message being sent.

Except for "create", "detected" and "removal" messages, processor 108 determines the type of message to be sent from the kind of input line (control, address or data) to which the received message pertains and the type of memory being simulated as indicated by the contents of the "et/ls" field in the link list record. Processor 108 can determine the kind of line for a particular memory block from the contents of the "fanout-gate" and "pin#" fields and information relating to such memory block stored in processor 108 when the simulation is initialized. "Assert", "create", "detected" and "removal" messages pertain only to faulty circuits, and will be described in more detail below. Messages for the good circuit prepared and sent as indicated by block 504 are limited to "address", "data", "read" and "write" messages.

As described above, a "read" or "write" operation can be initiated in a number of ways, depending on the type of memory being simulated. For example, in a level-sensitive memory, if the chip select and read lines are true, then a "read" operation will be initiated by a state change of any of the address or data lines. Thus, in such a case, receipt of an event message for a data or address line will cause two messages to be sent by processor 108: a first message including the new value of the address or data line and a second message to initiate the "read" operation.

After the event message or messages for the good circuit are sent, and if the message pertains to an event on a control or address line (block 505), processor 108 determines whether there are additional faulty-circuit records in its link list (block 506). If so, the next fault record is fetched (block 507) and the "faninflag" for the input line to which the message pertains is tested (block 508). If the "faninflag" is not set, indicating that the fault associated with the faulty circuit is not visible at the gate that initiated the event message, the fault record is updated in accordance with the event message (block 509). If the "fanin-flag" is set, no further action is taken for the current fault record and the next fault record is fetched.

Following the update of the fault record, the states of all the control and address lines in the fault record are compared with the corresponding states in the record for the good circuit (block 510). If all such states are identical, then the fault is not visible on the control and address lines and a "goodconverge" message is prepared and sent to processor 109 (block 511). In such message, "cdflag" is set at "converge" and, because the message being sent results from a message for the good circuit, "eventtype" is set at "good". However, if the state of any of the input lines is different, the fault is visible and a "diverge" message is prepared and sent to processor 109 wherein "cdflag" is set at "diverge" and "eventtype" is not used (block 512). Finally, if a "diverge" message is sent, "removal Jag" is reset (block 513) because the fault is visible and the fault record must remain. As will be seen this flag, when set, permits removal of the fault record. However, if a "converge" message is sent for a control or address line (block 514), the removal flag is set. The removal flag cannot be set for a data line because the convergence/divergence determination for data lines is made by processor 109. The above described process is repeated for each additional fault record.

The type of message or messages sent by processor 108 for a faulty circuit pursuant to blocks 511 and 512 depends on the event message received by processor 108 for the good circuit. Again, two messages can be sent if a change in state of an address or data line causes a "mad" or "write" operation.

In the usual situation, the particular fault in a faulty circuit is allowed to affect the operation of the memory block in the faulty circuit. For example, if the fault is in circuitry leading to a data line, incorrect data might by written; or if the fault is in circuitry leading to an address line, data might be written into or read from a wrong address. However, if an event message results in a "read" operation in the good circuit but the particular fault in the faulty circuit prevents a corresponding "read" operation in the faulty circuit, then such a "mad" operation must be forced or "asserted" so that event messages will be generated by processor 110 for the faulty circuit. In this situation, an "assert" message is sent pursuant to block 512. As will be seen, upon receipt of an "assert" message, processor 110 does not perform a read operation but uses the last-read value to prepare its event messages.

Figure 6:
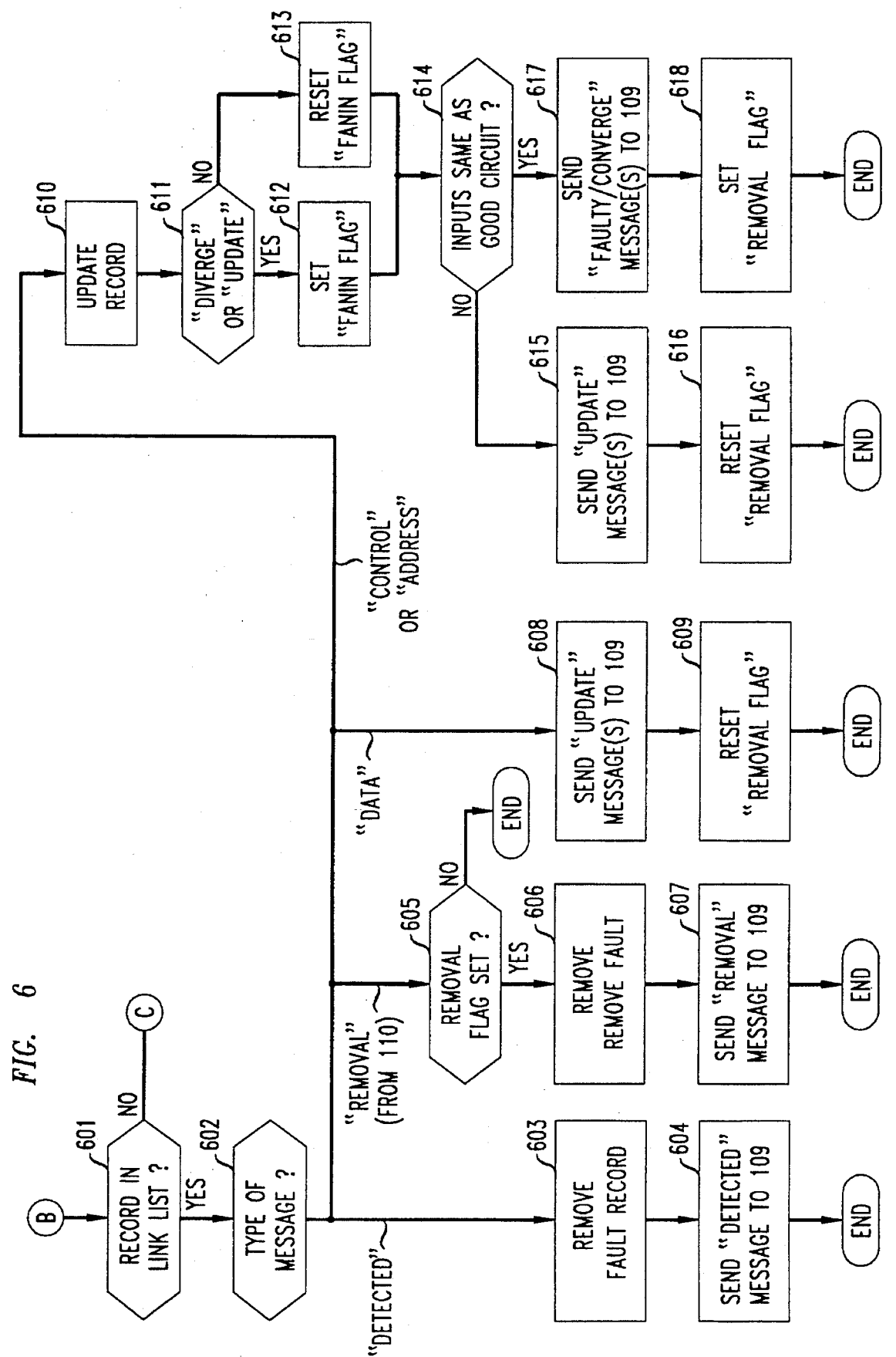
FIG. 6 is a flow chart showing the operation of the memory block during simulation of certain faulty circuit.

FIG. 6 is a flow chart of the operation of processor 108 upon receipt of an event message for a faulty circuit already visible at the relevant memory block. If a record for the fault exists in the link list (block 601), the type of message received determines the action to be taken (block 602). If it is a "detected" message (indicated by "cdflag" being set at "detected"), then the fault message is removed (block 603) and a "detected" message is sent to processor 109 (block 604). If it is a "data" message, no update is necessary in the link lists for processor 108 because such data is stored in processor 109. Accordingly, an "update" message is sent to processor 109 (block 608) and "removalflag" is reset (block 609). If the message is a "control" or "address" message, the appropriate fault record (identified by "fid") is updated (block 610) and "cdflag" is tested to determine whether to set or reset the "faninflag" associated with the input line to which the message pertains (block 611). If "cdflag" is set at "diverge" or "update ", indicating that the current fault is visible at the source of the message, then "faninflag" is set for such line (block 612), otherwise it is reset (block 613).

The inputs are then compared with those of the good circuit in a similar manner to that described in conjunction with block 510 in FIG. 5. If any input is different, an "update" message is sent to processor 109 (block 615) and "removalflag" is reset (block 616); if all the inputs are the same, indicating that the fault is no longer visible on those lines, then a "faulty/converge" message is sent (block 617) and "removalflag" is set (block 618), indicating that the fault record can be removed if the fault is not found visible by processors 109 and 110. Again, an "address" or "data" message sent pursuant to blocks 607, 615 or 617 can be followed by a "read" or "write" message if processor 108 determines that a "read" or "write" operation is to take place.

"Removal" messages are received by processor 108 from processor 110 when, as will be seen, processor 110 determines that fault records for a particular fault can be removed. If "removalflag" is set in the record for such fault (block 605), indicating that no intervening "data" message or message with "cdflag" set for "diverge" or "update" has been sent for the fault since the message giving rise to the "removal" message was sent by processor 108, then such fault record is removed (block 606) and a "removal" message sent to processor 109 (block 607). If "removalflag" is reset, the record is not removed and no message is sent.

Figure 7:
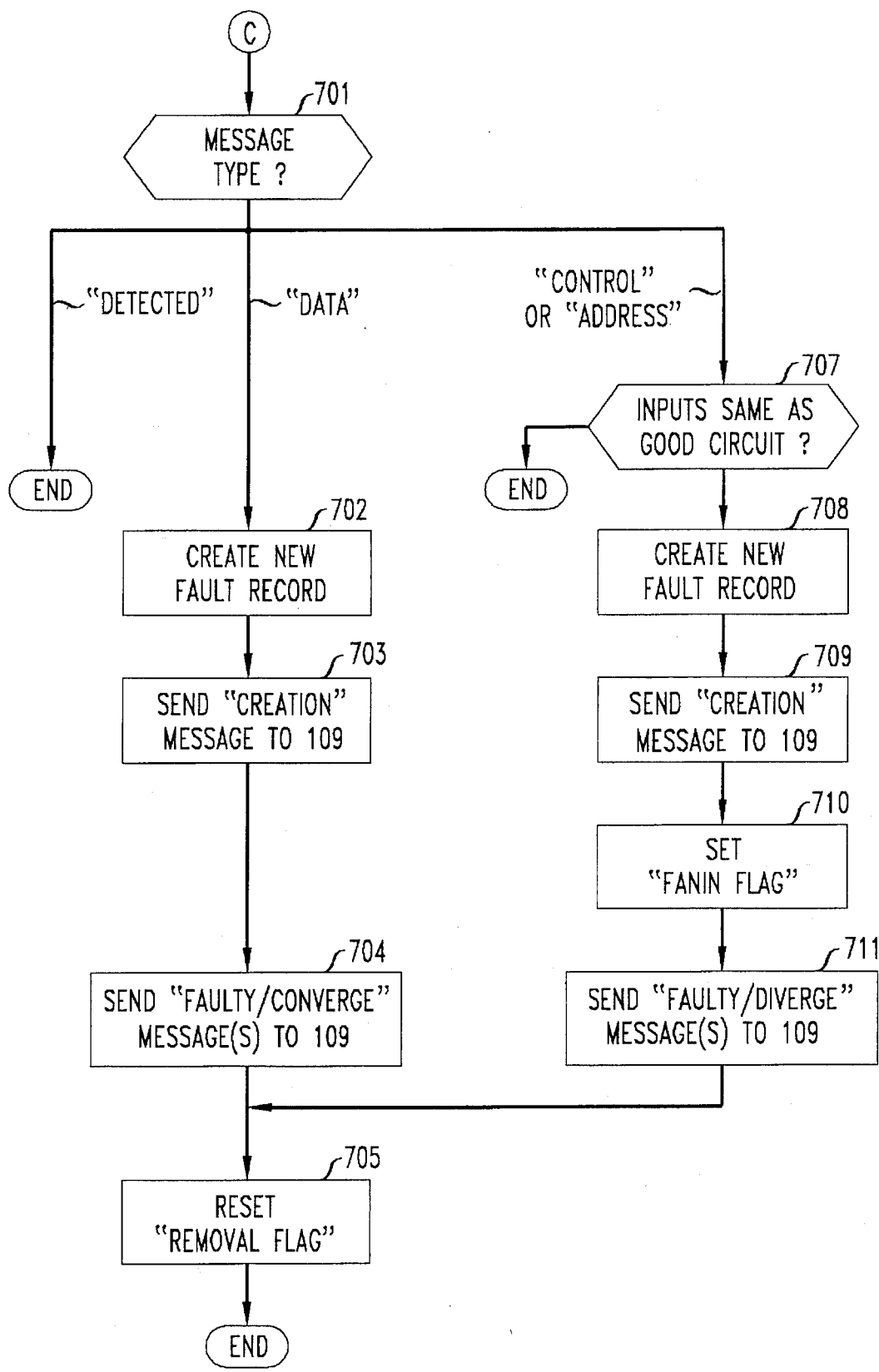
FIG. 7 is a flow chart showing the operation of the memory block during simulation of certain other faulty circuits.

FIG. 7 is a flow chart showing the operation of processor 108 upon receipt of a faulty-circuit message for a new fault that is not presently visible at the relevant memory block. First, the type of message is determined (block 701). If the message is a "detected" message, no further action is taken. This situation is analogous to that described for block 409 in FIG. 4. If the message is a "data" message, a new fault record is created (block 702); however, this record will simply be a copy of the good-circuit record because processor 108 stores only information relating to the "control" and "address" lines, not the "data" lines. Then a creation message is sent to processor 109 (block 703) which causes fault records to be created for the fault in processors 109 and 110, followed by a "faulty/converge" message (block 704). Because processor 108 is unable to determine from a "data" message whether the fault is still visible, it resets "removal flag" for the fault (block 705).

If the message is a "control" or "address" message, then all the control and address inputs are compared with their counterparts for the good circuit (block 707) in a manner similar to that described for block 614 in FIG. 6. If the inputs for the faulty and good circuits are the same, then no further action is taken. Otherwise, a new fault record is created by copying the record for the good circuit and modifying it in accordance with the just-received message for the faulty circuit (block 708). Then a creation message is sent to processor 109 (block 709) to cause corresponding fault records to be created in processors 109 and 110 and the fanin flag is set for the particular control or address line to which the message relates (block 710). This records that the fault is visible at the source of the message. Finally, a "faulty/ diverge" message is sent to processor 109 (block 711) indicating that the fault is visible in processor 108, and "removalflag" is reset (block 705). Again, a "read" or "write" message can be sent following an "address" or "data" message if the memory block being simulated is level-sensitive.

Figure 8:
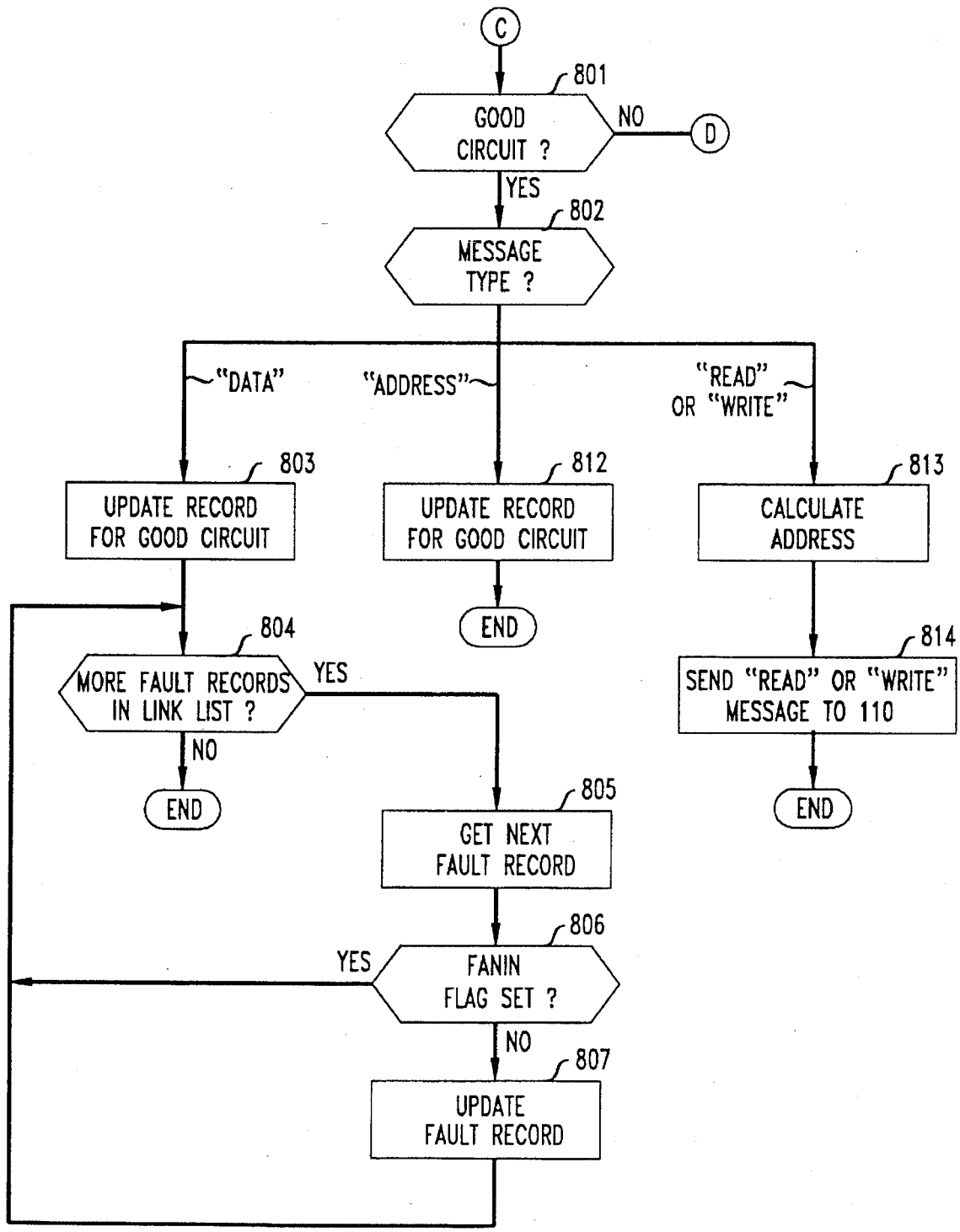
FIG. 8 is a flow chart showing the operation of a memory block descriptors processor in the pipelined multiprocessor during simulation of a good circuit.

FIG. 8 is a flow chart of the operation of memory block descriptors processor 109 in response to receipt of an event message for the good circuit. If a received message is for the good circuit (block 801) and pertains to a data input line (block 802), the link list record for the good circuit is updated (block 803). Then processor 109 determines whether there are additional faulty-circuit records in its link list (block 804). If so, the next fault record is fetched (block 805) and the "fanin-flag" for the data line to which the message pertains is tested (block 806). If such flag is reset indicating that the fault associated with the faulty circuit is not visible at the gate that initiated the event message, the fault record is updated in accordance with the event message (block 807). If such flag is set, no further action is taken for the current fault record and the next fault record is fetched.

If the received message pertains to an address input line, the link list record for the good circuit is updated (block 812). If the received message is a "read" or "write" message, then processor 109 calculates the read or write address from the information in the "address" and "offset" fields in such link list record (block 813) and sends a "read" or "write" message to processor 110 (block 814). In the case of a "write" message, the actual data to be written is obtained from the "data" field in the link fist record and included in such message.

Figure 9:
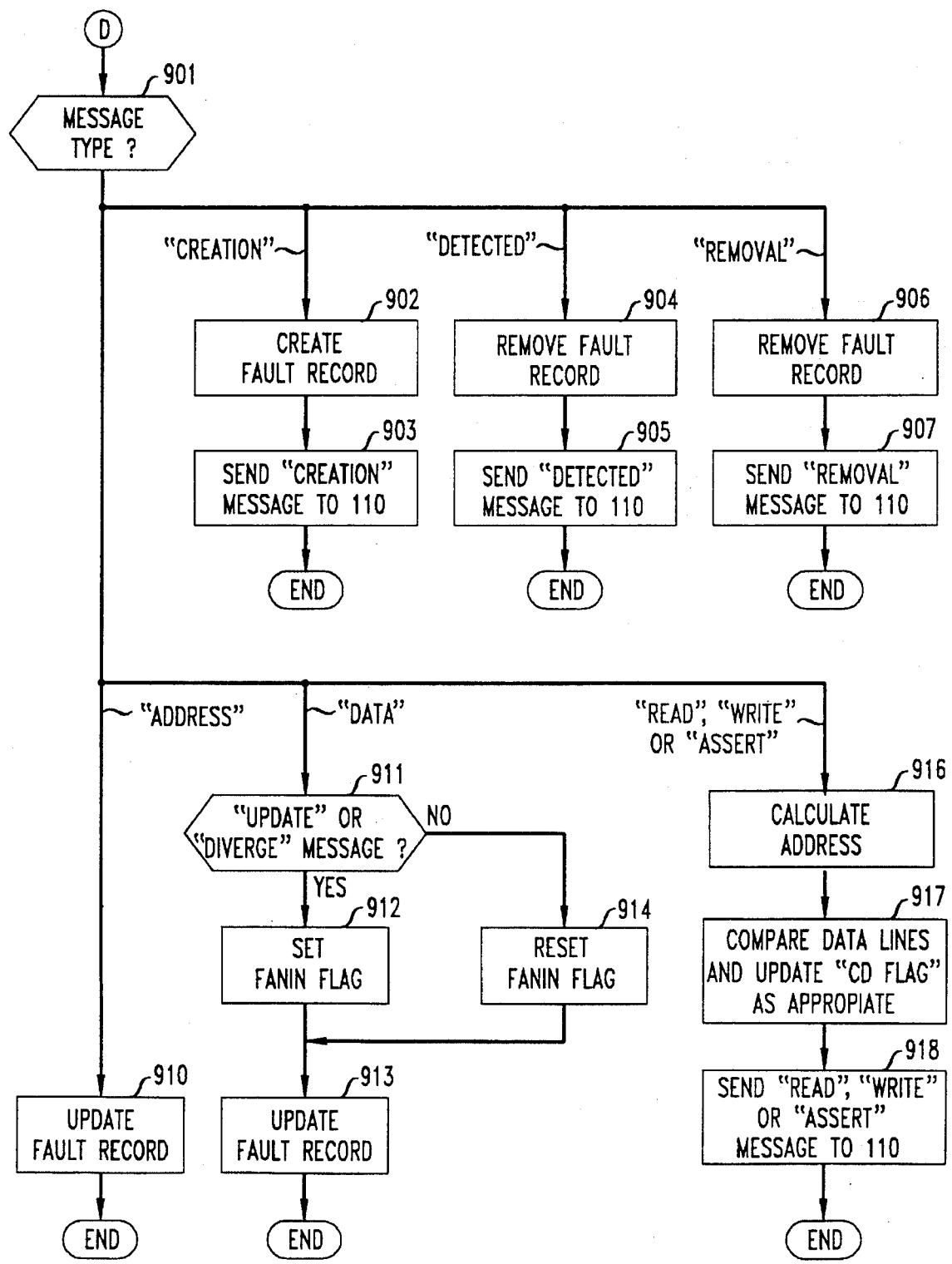
FIG. 9 is a flow chart showing the operation of a memory block descriptors processor during the simulation of faulty circuits.

FIG. 9 is a flow chart of the operation of processor 109 after receiving an event message for a faulty circuit. The type of message is first determined (block 901). If the message is a "creation" message, then a fault record is created for the particular fault identified in the "fid" field in the message (block 902) and a "creation" message is sent on to processor 110 (block 903). If the message is a "detected" or "removal" message the appropriate action is carded out (blocks 904 and 906) and a corresponding message is forwarded to processor 110 (blocks 905 and 907). In the case of an "address" message, the fault record is updated (block 910). For a "data" message in which "cdflag" is set at "update" or "diverge" (block 911), the "datafaninflag" for the data line to which the message pertains is set (block 912) and the "data" field in the fault record is updated (block 913); for such messages in which "cdflag" is set at "converge", the "datafaninflag" for the relevant data line is reset before the "data" field is updated (block 914).

In the case of a "read", "write", or "assert" message, the address is calculated (block 916) as described for block 813 in FIG. 8 and a corresponding control message is sent to processor 110 (block 918), including information from the "data" field of the fault record in the case of a "write" message. However, if "cdflag" in the message received by processor 109 is set at "converge," the states of the "data" fines in the fault record are compared with the corresponding states in the record for the good circuit and "cdflag" in the message to processor 110 is updated if needed (block 917). If all such data-line states are identical, then the fault is not visible on the data lines and "cdflag" is not updated. However, if any such state is different, then the fault is visible, and ",cdflag" is set at "diverge" when "eventtype" in the message from processor 108 is set at "good" (indicating that such message stems from an event message for the good circuit) or at "update" if "eventtype" in the message from processor 108 is set at "faulty" (indicating that such message stems from an event message for the faulty circuit).

As described above, the fanin flags for the various address, data and control lines for a memory block are set and reset in accordance with the state of "cdflag" in event messages for faulty circuits. However, it is important that fault records be in place and that the fanin flags in such records be in the correct states whenever an event message for the good circuit is received at processor 108 (in the case of the fanin flags for address and control lines) or processor 109 (in the case of the fanin flags for the data lines). Good-circuit event messages may arrive at processors 108 and 109 before faulty-circuit messages that would cause such fault records to be created and/or the fanin flags to be set or reset. To overcome this problem, interface processor 114 shown in FIG. 1 generates special fanin-flag messages in response to event messages from fault data processor 106.

As shown in blocks 215 and 217 of FIG. 2, processor 106, in response to an event message for the good circuit, sends either a "diverge" or "converge" message to processor 114 for each fault in its fault list. Such messages have the following format:

fanout-gate, fid, cd-flag

Processor 114 stores pointers and fanout lists for each logic gate similar to those stored in processors 103 and 104, but listing only fanouts that are address, data, or control lines on memory blocks. On receipt of an event message from processor 106, processor 114 sends a fanin flag message to processor 108 of the form:

fid, cd-flag for each entry in the relevant fanout list. For each such fanin flag message containing an "fid" for which a fault record has not yet been created, processor 108 creates such record and sends a "creation" message to processor 109, as in blocks 708 and 709 in FIG. 7. If the fanin flag message pertains to an address or control line, processor 108 then sets or resets the relevant "addressfaninflag" or "datafaninflag" in accordance with the state of "cdflag" in the message, as in blocks 611,612 and 613 in FIG. 6. If the fanin flag message pertains to a data line, processor 108 forwards the message to processor 109, which sets or resets the relevant "datafanin flag" in accordance with "cdflag," as in blocks 911, 912 and 914 in FIG. 9.

Figure 10:
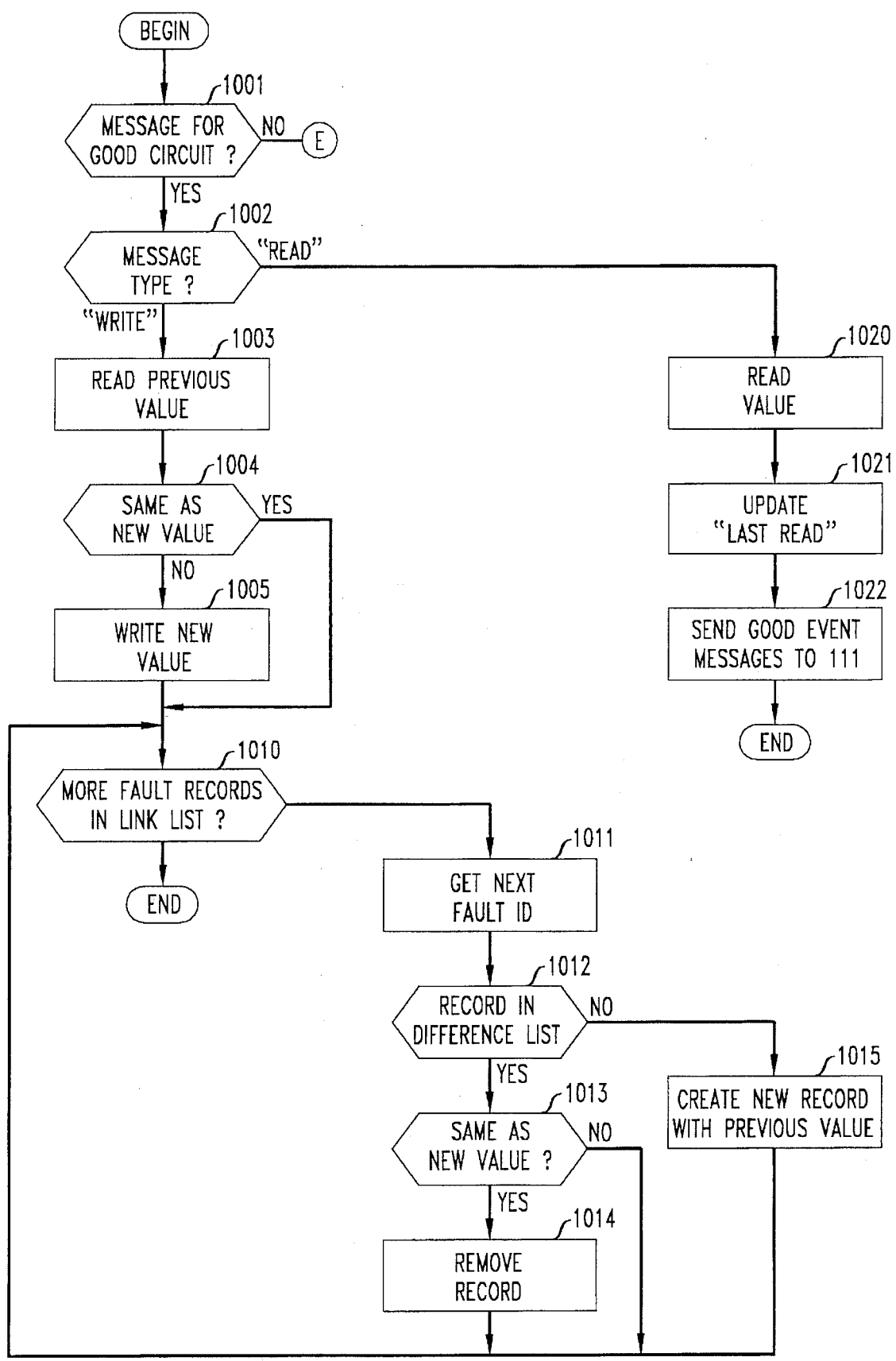
FIG. 10 is a flow chart showing the operation of a physical memory processor in the pipelined multiprocessor during simulation of a good circuit.

FIG. 10 is a flow chart showing the operation of physical memory processor 110. Upon receiving a "write" message for the good circuit (blocks 1001 and 1002), in which the "msgvalue" field contains the relevant address and data, processor 110 first reads the value previously stored at such address in the simulated memory for the good circuit (block 1003) and compares such previous value with the new value in the "write" message (block 1004). If the values are not the same, then the new value is written at such address (block 1005). Then the difference list is updated as follows. For each fault record in the link list (block 1010), the fault identification number is used (block 1011) to access the difference list for such fault to determine whether there is a record in such difference list for such address (block 1012). If so, a comparison is made between the value in such record and the new value (block 1013), and if the values are the same, such record is removed from the difference list (block 1014). If there is no record for such address, then a record is created in the difference list using the previous value read for the good circuit in block 1003.

Upon receiving a "read" message for the good circuit, in which the "msgvalue" field contains the relevant address, processor 110 reads the value stored at such address (block 1020), updates the "lastreadvalue" record for the good circuit (block 1021), and sends a good event message for each data output line in the memory block being simulated. The "currentstate" field in each message will contain the value just read for the data output line identified in the "sourcegate" field of such message.

Figure 11:
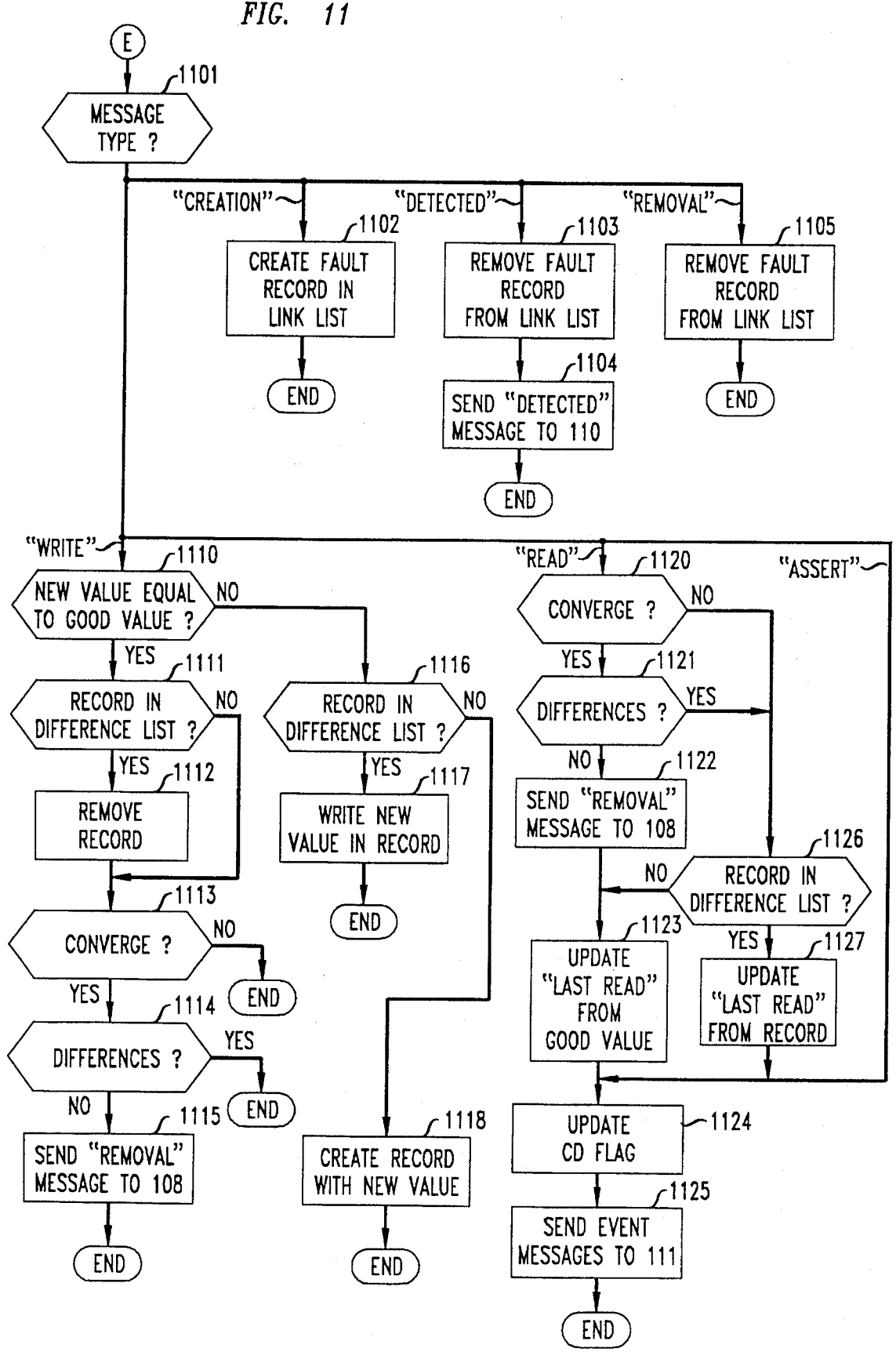
FIG. 11 is a flow chart showing the operation of the physical memory processor during simulation of faulty circuits.

FIG. 11 is a flow chart showing the operation of processor 110 upon receipt of an event message for a faulty circuit. As can be seen from such figure, six types of messages: "creation", "detected", "removal", "write", "read" and "assert" can be received (block 1101). Upon receipt of a "creation" message, a fault record is created in the link list for the particular fault identified in the "fid" field in the message (block 1102). For "detected" and "removal" messages, the fault record for the identified fault is removed from the link list (blocks 1103 and 1105). In the case of a "detected" message, processor 110 sends a series of "detected" messages on to processor 111, one message for each data output line in the memory block being simulated.

Upon receipt of a "write" message for a faulty circuit, the new value to be written is compared with the value stored for the good circuit at the same address (block 1110). If the values are the same, then the difference list is checked to determine whether there is a record for such address (block 1111). If so, such record is removed (block 1112) because the values for that address are no longer different. Next, if "cd flag" in the message is set at "converge" (block 1113) and if the pointer for such faulty circuit in the pointer list is "null," indicating that there are no other differences in the difference list for such fault (block 1114), a removal message is sent to processor 108, (block 1115) which will initiate removal of all fault records for such fault from processors 108, 109 and 110, depending on the state of the "removal" flag (blocks 605, 606 and 607 in FIG. 6). If "cdflag" is not set at converge or there are still differences, no further action is taken.

If the comparison carried out pursuant to block 1110 shows that the new value for the faulty circuit is different from that of the good circuit, and there is a record in the difference list for the relevant address (block 1116), then the new value is written in such record (block 1117). Otherwise, a new record is created for such address using the new value (block 1118).

Upon receipt of a "read" message for a faulty circuit, if "cdflag" is set at "converge" (block 1120) and there are no differences stored for such fault (block 1121), then the records for such fault can be removed from processors 108, 109 and 110 and a "removal" message is sent to processor 108 (block 1122). (Note, however, that removal of such fault record in processor 110 will not occur until subsequent receipt of a removal message from processor 109 and removal takes place in accordance with block 1105). In order to be able to send event messages to processor 111, the value from the "lastread" field in the link list record for the good circuit is copied into the "lastread" field for the faulty circuit (block 1123). Then "cdflag" is updated for such event messages if needed (block 1124). If "cdflag" in the message received by processor 110 is set at "converge," but there are still differences stored for the faulty circuit, the fault is still visible and "cdflag" is set at "diverge" when "eventtype" in the received message is "good" or at "update" when "event type" in such message is "faulty." Finally, an event message for each data output line is sent to processor 111 using the values from "lastread" for the faulty circuit (block 1125).

If "cdflag" is set at "update" or "diverge" in the received message or differences still exist and if there is a record in the difference list for the relevant address (block 1126), then "lastread" is updated from such record (block 1127). If there is no such record in the difference list, then "lastread" for the faulty circuit is updated from "lastread" for the good circuit (block 1123).

If the received message is an "assert" message, all that is necessary is to update "cdflag" (block 1124) and send the event messages (block 1125) in accordance with the values in "lastread" for the faulty circuit.

As can be seen from the above description, many of the operations in processors 106, 108, 109 and 110 involve the searching of link lists to determine whether a record for a particular fault is present. In a preferred embodiment of the invention, such link lists are sorted by fault identification number and divided into four separate lists. Such arrangement speeds up the searching process for both good-circuit and faulty-circuit events. Other arrangements of such link lists can be used if desired.

In order to avoid bottlenecks in the pipeline shown in FIG. 1 and to speed up the simulation operation, it may be desirable to replicate processors having a large storage or processing burden. For example, in the preferred embodiment of the invention described above, two fault data processors 106 have been provided. Event messages for faulty circuits having odd fault identification numbers are directed to the first of such processors by processor 105; messages for faulty circuits having even fault identification numbers are directed to the second of such processors. The first processor maintains fault records for the odd-numbered faults and the second processor maintains fault records for the even-numbered faults. Messages for the good circuit are directed to both processors so that either processor can perform the necessary comparisons between the good circuit and any faulty circuit for which it stores the fault records. Both of such processors send event messages to processor 107 and fanout messages to processor 114. It will be clear that the other processors shown in FIG. 1 can be replicated in a similar manner as necessary.

It is understood that other embodiments are possible that incorporate the principles of our invention and that the above disclosure is merely illustrative of such principles and is not intended to be limiting in any respect.

What is claimed is:

1. A method of using multiple processors for concurrently simulating a good version of a circuit containing input terminals, output terminals, logic gates and functional blocks and multiple faulty versions of said circuit, each said faulty version having a single fault, for the purpose of identifying which of a number of test vectors specifying input states for said circuit and applied to said input terminals will detect one or more of said faults, which comprises:

connecting said processors in a pipeline configuration wherein each processor sends event messages to at least the next processor in said pipeline and receives event messages from at least the preceding processor in said pipeline, said pipeline having a main portion, a first branch and a second branch in parallel with said first branch, said main portion, said first branch and said second branch each containing at least one of said processors, a processor at the end of said main portion being connected to send event messages to at least a processor at the beginning of said first branch and a processor at the beginning of said second branch, a processor at the end of said first branch and a processor at the end of said second branch both being connected to send event messages to at least a processor at the beginning of said main portion;

in at least one of said processors in said main portion, sending first event messages representing the input states specified by each test vector in turn;

in at least one of said processors in said main portion, storing connection information representing the interconnections among the logic gates and functional blocks in said circuit and sending second event messages representing input states of said logic gates and third event messages representing input states of said functional blocks in accordance with said connection information in response to said first event messages representing test vectors and fourth event messages representing new output states after changes from previous output states of said logic gates and said functional blocks;

in the processors in said first branch, simulating the operation of said logic gates in the good and faulty versions of said circuit in response to said second event messages representing input states of said logic gates and sending fifth event messages representing the output states of said logic gates resulting from said logic-gate simulation;

in the processors in said second branch, simulating the operation of said functional blocks in the good and faulty versions of said circuit in response to said third event messages representing input states of said functional blocks and sending sixth event messages representing the output states of said functional blocks resulting from said functional-block simulation;

in at least one of said processors in said main portion, converting said fifth event messages representing output states of said logic gates and said sixth event messages representing output states of said functional blocks into said fourth event messages representing new output states after changes from previous output states of said logic gates and said functional blocks;

in at least one of said processors in said main portion, logging successive states of said output terminals for the good and faulty versions of said circuit in response to said fourth event messages and, upon completion of simulation for a given test vector, comparing the final states of said output terminals for the good version of said circuit and the final states of said output terminals for each faulty version of said circuit and, if said comparison results in at least one difference in said final states, indicating that said given test vector detected the fault in said faulty version.

2. The method of claim 1 wherein said functional block is a memory block, which further comprises the steps of:

in said processors in said second branch, upon receiving one of said third event messages resulting in a write operation for a memory block in the good circuit, storing the relevant data in the good-circuit record in one of said processors in said second branch and upon receiving one of said third event messages resulting in a read operation for the good circuit, retrieving the relevant data from said good-circuit record.

3. The method of claim 2 which further comprises the steps of:

in said processors in said second branch, upon receiving one of said third event messages resulting in a write operation for a memory block in a faulty circuit, if the data to be written differs from that written for the same address in the corresponding good-circuit record, writing said data in association with said address in the relevant faulty-circuit record in one of said processors and upon receiving one of said third event messages resulting in a read operation for a faulty circuit, if the data to be read is not stored in the relevant faulty-circuit record, thereby indicating that the data to be read is the same as the data written for the same address in the corresponding good-circuit record, retrieving said data from the same address in the corresponding good-circuit record.

4. The method of claim 3 which further comprises the steps of:

in said processors in said second branch, while simulating a read operation for a memory block in a faulty circuit, storing the value read in the faulty-circuit record for said faulty circuit, and after simulating a read operation for a memory block in the good circuit, if the corresponding read operation in a faulty circuit does not occur because of the fault in said faulty circuit, simulating the effect of such fault on said memory block by retrieving said stored value from said faulty-circuit record for use as the result of said simulated read operation in said faulty circuit.

5. The method of claim 1 which further comprises the steps of:

storing at least one record relating to each faulty version of said circuit being simulated in at least one of said processors and in the processors in said main portion that perform said comparing step, if at least one difference is detected, sending at least one seventh event message causing deletion of said records relating to the faulty version for which said difference is detected to reduce the number of faulty versions of said circuit to be simulated for subsequent test vectors, thereby reducing the fault simulation time needed for said subsequent text vectors.

6. Apparatus for concurrently simulating a good version of a circuit containing input terminals, output terminals, logic gates and functional blocks and a plurality of faulty versions of said circuit, each said faulty version having a single fault, for the purpose of identifying which of a plurality of test vectors specifying input states for said circuit and applied to said input terminals will detect one or more of said faults, which comprises:

a plurality of processors connected in a pipeline configuration wherein each processor sends event messages to at least the next processor in said pipeline and receives event messages from at least the preceding processor in said pipeline, said pipeline having a main portion, a first branch and a second branch in parallel with said first branch, said first branch and said second branch each containing at least one of said processors, a processor at the end of said main portion being connected to send event messages to at least a processor at the beginning of said first branch and a processor at the beginning of said second branch, a processor at the end of said first branch and a processor at the end of said second branch both being connected to send event messages to at least a processor at the beginning of said main portion;

means in at least one of said processors in said main portion for sending first event messages representing the input states specified by each test vector in turn;

means in at least one of said processors in said main portion for storing connection information representing the interconnections among the logic gates and functional blocks in said circuit and for sending second event messages representing input states of said logic gates and third event messages representing input states of said functional blocks in accordance with said connection information in response to said first event messages representing test vectors and fourth event messages representing new output states after changes from previous output states of said logic gates and said functional blocks;

in the processors in said first branch, means for simulating the operation of said logic gates in the good and faulty versions of said circuit in response to said second event messages representing input states of said logic gates and for sending fifth event messages representing the output states of said logic gates resulting from said logic-gate simulation;

in the processors in said second branch, means for simulating the operation of said functional blocks in the good and faulty versions of said circuit in response to said third event messages representing input states of said functional blocks and for sending sixth event messages representing the output states of said functional blocks resulting from said functional-block simulation;

means in at least one of said processors in said main portion for converting said fifth event messages representing output states of said logic gates and said sixth event messages representing output states of said functional blocks into said fourth event messages representing new output states after changes from previous output states of said logic gates and said functional blocks;

means operative in at least one of said processors in said main portion for logging successive states of said output terminals for the good and faulty versions of said circuit in response to said fourth event messages and, upon completion of simulation for a given test vector for comparing the final states of said output terminals for the good version of said circuit and the final states of said output terminals for each faulty version of said circuit and, if said comparison results in at least one difference in said final states, indicating that said given test vector detected the fault in said faulty version.

* * * * *